United States Patent [19]

Noda et al.

[11] Patent Number: 4,589,016

[45] Date of Patent: May 13, 1986

[54] FM TELEVISION SIGNAL RECEIVING CIRCUIT

[75] Inventors: Masaki Noda; Keiro Shinkawa, both of Yokohama; Takeshi Saitoh, Tokyo; Hiroshi Hatashita, Yokohama; Shigeo Matsuura, Chigasaki, all of Japan

[73] Assignee: Hitachi, Ltd., Tokyo, Japan

[21] Appl. No.: 508,467

[22] Filed: Jun. 28, 1983

[30] Foreign Application Priority Data

Jun. 28, 1982 [JP] Japan ................... 57-109709

[51] Int. Cl.4 .................. H04K 1/02; H04N 7/167
[52] U.S. Cl. .................... 358/118; 455/208; 358/123
[58] Field of Search ............... 358/118, 123, 171, 172, 358/195.1, 188, 142; 455/208, 182, 192

[56] References Cited

U.S. PATENT DOCUMENTS

| 4,216,500 | 8/1980 | St. Louis | 358/118 |
| 4,415,929 | 11/1983 | Yoshisato | 358/172 |
| 4,417,279 | 11/1983 | Shinkawa et al. | 358/195.1 |
| 4,439,787 | 3/1984 | Mogi et al. | 358/195.1 |

Primary Examiner—S. C. Buczinski
Attorney, Agent, or Firm—Antonelli, Terry & Wands

[57] ABSTRACT

A receiving circuit for receiving an FM-modulated television signal with an energy dispersal signal superposed thereon is used for a television receiver for receiving the FM-modulated television signal. The receiving circuit is provided with a triangle wave signal generator for generating a triangle wave signal in synchronism with a vertical synchronizing signal. The energy dispersal signal superposed on the FM-modulated television signal is suppressed by frequency modulating an oscillation signal of a local oscillator by the triangle wave signal obtained.

5 Claims, 14 Drawing Figures

FM TELEVISION SIGNAL RECEIVING CIRCUIT

BACKGROUND OF THE INVENTION

The present invention relates to a receiving circuit of a television receiver for receiving an FM-modulated television signal.

A new television broadcasting system for transmitting television signals by use of an artificial satellite is contemplated. In this system, the FM-modulated television signal is transmitted on an electromagnetic wave of SHF band, especially, between 11 GHz and 12 GHz. A block diagram of a conventional receiving circuit for receiving the FM television signal is shown in FIG. 1. This receiving circuit receives the FM television signal of SHF band transmitted from the artificial satellite and converts it into a video signal. The FM television signal of approximately 12 GHz in frequency is received at an antenna 1 and applied to a first mixer 2 connected to the antenna 1. The first mixer 2 is connected to a first local oscillator 3 for producing a local oscillation signal which is supplied to the first mixer 2. The frequency of this local oscillation signal is confined to a predetermined value such as 10.74 GHz. The FM television signal is converted to a signal of UHF band of about 960 to 1460 MHz by the first mixer 2 and the converted signal is applied to an amplifier 4 connected to the first mixer 2. Generally, the antenna 1, the first mixer 2, the first local oscillator 3 and the amplifier 4 are installed outdoors. The first mixer 2, the first local oscillator 3 and the amplifier 4 make up a first heterodyne receiving circuit, by which the television signal is converted to a UHF signal and transmitted indoors. The second mixer 6 is connected with a second local oscillator 8 for generating a local oscillation signal to be applied to the second mixer 6. The frequency of this local oscillation signal is varied in accordance with a channel to be received, e.g. in accordance with a tuning voltage generated by a channel selector 7. The television signal in UHF band is converted into a signal of VHF band of about 130 MHz at a second heterodyne receiving circuit including the second mixer 6 and the second local oscillator 8. The signal thus converted is applied to a limiter circuit 9 connected to the second mixer 6. At the limiter circuit 9, an amplitude of the VHF signal is limited to remove AM noise. An output signal of the limiter circuit 9 is applied to an FM detector 10, where the signal is FM-detected to be converted into a video signal and an audio signal. The FM-detected signal flows into two routes. One of the routes contains an audio signal demodulator circuit 11 where the FM-detected signal is demodulated into an audio signal. The other route contains an amplifier 12 where it is amplified. The amplified signal is applied to an emphasis circuit where it is deemphasized, and then applied to a clamp circuit 14 where an energy dispersal signal contained therein is removed. An output signal of the clamp circuit 14 passes through an amplifier 15 and goes out as a video television signal. The amplifier 15 is followed by a video signal output circuit and a picture tube for reproducing an original picture. Heretofore, the energy dispersal signal has been removed by the clamp circuit 14.

FIG. 2 illustrates a television signal with the energy dispersal signal 16 superposed thereon. Specifically, the energy dispersal signal 16 is a triangle wave signal at frequency which is 1/n (n is an integer) of a field frequency of the video signal. In connection with the frequency of the energy dispersal signal, if n=2, it is ½ of the field frequency, i.e. 30 Hz. The energy dispersal signal is superposed on the television signal in synchronism with a vertical synchronizing signal 18 of the video signal. A conventional clamp circuit is illustrated in FIG. 3. This clamp circuit is a diode clamp circuit composed of a capacitor 20 and a diode 21. The diode 21 is connected to a voltage source of $V_0$ composed of resistors 22 and 23 and a capacitor 24. With this circuitry, when the signal as shown in FIG. 2 is input to an input terminal 19, a signal waveform at an output terminal 25 changes with a capacitance of the capacitor 20 in the clamp circuit. If the capacitance of the capacitor 20 is selected to be large, the charge/discharge time constant of the capacitor 20 becomes large, so that the diode 21 can not be switched at high frequency. The clamp circuit performs a clamp operation at a fixed voltage as defined by the peak voltage of the energy dispersal signal at low frequency. Therefore, this clamping operation can not remove the energy dispersal signal and also can not clamp the video signal. Conversely, when the capacitance of the capacitor 20 is selected to be small, the charge/discharge time constant of the capacitor 20 becomes small. In this case, when the horizontal and vertical synchronizing pulse signals are applied to the input terminal 19, the diode 21 is conductive to set at $V_0$ the peak voltage of the synchronizing pulse superposed on the video signal. As a result, the energy dispersal signal 16 is suppressed and the video signal 17 is clamped at voltage $V_0$, as shown in FIG. 4. The video signal 17 thus clamped is output from the output terminal 25. Now, a defect of the conventional diode clamp circuit is that a sag 26 occurs in the vertical synchronizing signal because the vertical synchronizing signal 18 renders the diode 21 imperfectly conductive. If this sag 26 is large, the synchronization in the television receiver is performed incorrectly.

Recently in the U.S.A., a pay television system has become prevalent. In order to prevent the theft of service, this pay TV system employs a system of using a scrambled signal in which the television signal is modified or scrambled so as not to be received by the normal TV set unless it is provided with an adaptor specially designed so as to receive the scrambled signal. A typical example of this scrambling system is disclosed in a paper entitled PAY-TV DECODER in "RADIO-ELECTRONICS", February 1981, pp 41–54. In this system, the horizontal and vertical synchronizing signals are suppressed, but the synchronizing information instead of the suppressed synchronizing pulse is contained in the audio signal. For this reason, the normal TV set when receiving the scrambled signal will not reproduce a coherent picture on the screen due to the asynchronism of the TV receiver with the TV broadcasting station. In executing the scrambling system using the waves in SHF band relayed by the artificial satellite, the energy dispersal signal must additionally be contained in the television signal. To reproduce such television signal, the energy dispersal signal must completely be removed from the television signal and then subjected to various signal processings. This scrambling system suppreses the synchronizing signal, as described above. Therefore, it is evident that the energy dispersal signal can not be removed by using the diode clamp circuit of the type in which the synchronizing signal is used for removing the energy dispersal signal.

SUMMARY OF THE INVENTION

An object of the present invention is to provide a receiving circuit which can satisfactorily remove the energy dispersal signal from a television signal with the energy dispersal signal superposed thereon.

To achieve the above object, in the present invention, a vertical synchronizing pulse separated from the video signal or the audio signal in the video band is frequency-divided. The frequency-divided signal is used for removing the energy dispersal signal. A triangle wave signal at the same period as that of the energy dispersal signal is generated. Voltages at the positions of the vertical synchronizing signal in the video signal are detected in synchronism with the synchronizing pulse frequency divided, thereby to detect the amplitude of the energy dispersal signal. The amplitude of the triangle wave signal is generated according to the magnitude and the direction of the amplitude of energy dispersal signal. The triangle wave signal is superposed on a channel select voltage, while the phase thereof is inverted. A local oscillation frequency is controlled by the channel select voltage, thereby to remove the energy dispersal signal. With this arrangement, there is provided a video signal free from the sag. Further, the energy dispersal signal can be removed from the FM television signal in the scrambling system in which the synchronizing signal in the video signal is suppressed.

DESCRIPTION OF THE PREFERRED EMBODIMENTS

Figure 1:
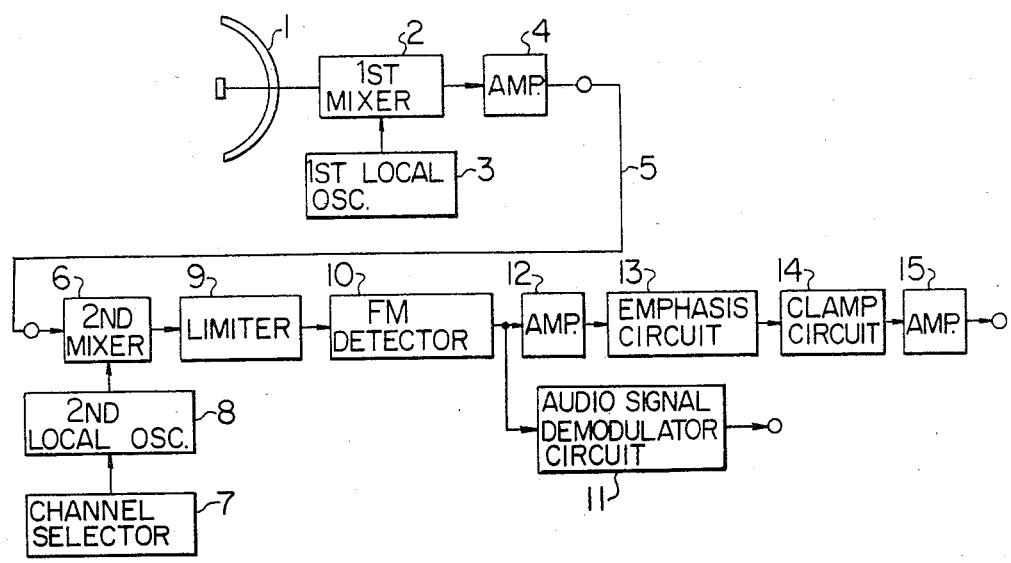
FIG. 1 shows a block diagram of a major part of a prior art television receiver for receiving an FM-modulated television signal.
Figure 2:
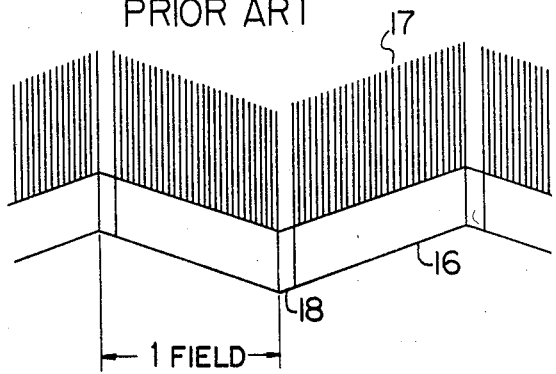
FIG. 2 shows a waveform of a video signal with an energy dispersal signal superposed thereon in accordance with the prior art.
Figure 3:
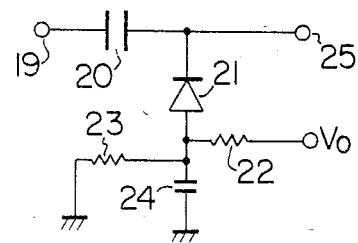
FIG. 3 is a circuit diagram of a conventional prior art diode clamp circuit.
Figure 4:
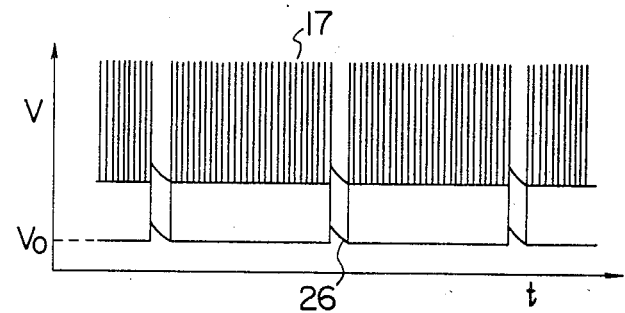
FIG. 4 shows a waveform of a video signal of which the vertical synchronizing signal contains sag in accordance with the prior art.
Figure 5A:
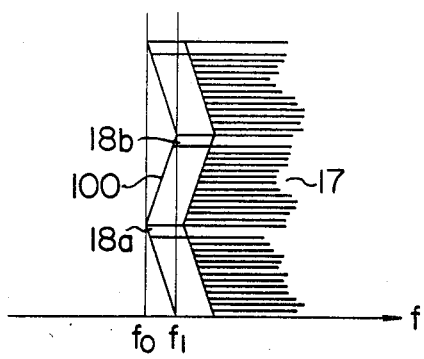
FIG. 5a shows a frequency allocation of the FM-modulated television signal in SHF band or UHF band according to this invention.
Figure 5B:
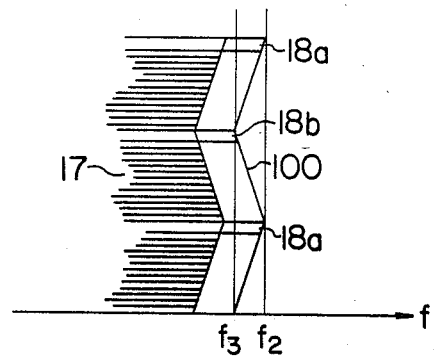
FIG. 5b shows a frequency allocation of the FM-modulated television signal in VFH band according to this invention.

An embodiment of the receiving circuit according to this invention will be described referring to the accompanying drawings. FIG. 5a illustrates the frequency allocation of an FM television signal in SHF band. In connection with a television signal to be FM-modulated, an FM signal with the frequency varying with an amplitude of the television signal is used. A vertical synchronizing signal 18a is located at a frequency $f_0$ which is lower than that of the video signal 17. Superposed on this FM-modulated television signal 17. Superposed on this FM-modulated television signal is an energy dispersal signal 100 with a triangle waveform which is in synchronism with the vertical synchronizing signals 18a and 18b. The vertical synchronizing signals 18a and 18b always undergo a variation up to a frequency $f_1$ maximum with respect to the frequency $f_0$. The same thing is true for the FM-modulated television signal in UHF band obtained in the first mixer 2. In the television signal in VHF band, as shown in FIG. 5b, the frequency of the vertical synchronizing signal 18a is allocated at a frequency $f_2$ and the vertical synchronizing signal 18b at frequency $f_3$. These vertical synchronizing signals 18a and 18b undergo a variation between the frequency $f_3$ and the frequency $f_2$. Therefore, the frequency variation of the vertical synchronizing signal 18b caused by the energy dispersal signal 100 will be cancelled, if a triangle wave signal, which is generated at the same periods as that of the energy dispersal signal 100, for example, and in synchronism with the vertical synchronizing signal, is superposed, with proper amplitude and polarity, on the channel select signal and an oscillation frequency of the second local oscillator 8 is modified by the triangle wave signal thus generated. Further, the change of the oscillation frequency of the first local oscillator 3 will suppress the energy dispersal signal. However, it is undesirable to change the oscillation frequency of the first local oscillator 3 from a practical view point. For this reason, the receiving circuit according to this invention is so designed that the frequency of the second local oscillator 8 is varied.

Figure 6:
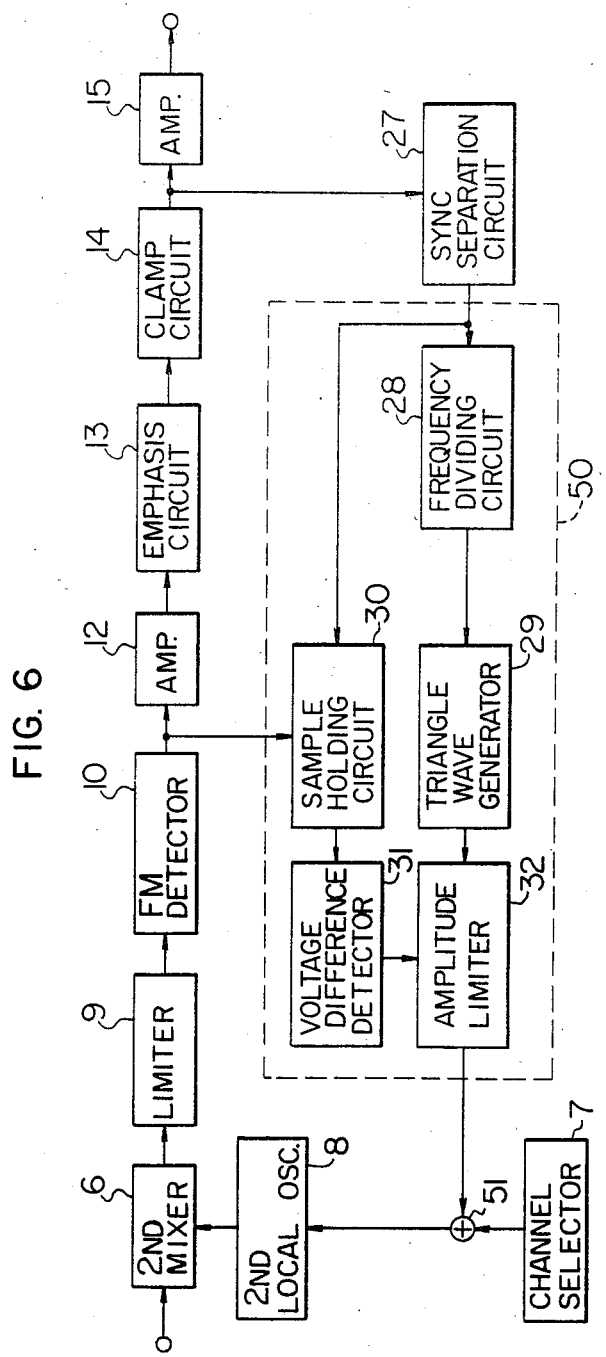
FIG. 6 is a block diagram of a major part of a first embodiment of a receiving circuit according to this invention.

FIG. 6 shows an embodiment of a major part of a receiving circuit according to this invention. An output signal from the clamp circuit 14 is partially directed to a synchronizing separation circuit 27. By the synchronizing separation circuit 27, a vertical synchronizing signal is extracted and is applied to a frequency dividing circuit 28 where it is frequency divided by a factor of two. The frequency divided vertical synchronizing signal (frequency-divided pulse) is supplied to a triangle wave generator 29. The triangle wave generator 29 is in synchronism with the vertical synchronizing signal to produce a triangle wave signal with a ½ frequency of that of the vertical synchronizing signal. The vertical synchronizing signal separated by the synchronizing separation circuit 27 is also supplied to a sample holding circuit 30. The sample holding circuit 30 is also supplied with an FM-detected television signal from the FM detector 10. In the sample holding circuit 30, a voltage at a location of the vertical synchronizing signal in the television signal appearing at the output of the FM detector 10 is sampled by the vertical synchronizing signal supplied from the synchronizing separation circuit 27, and then held therein. The vertical synchronizing signal supplied from the synchronizing separation circuit 27 to the sample holding circuit 30 is the same as that contained in the television signal supplied from the FM detector 10 to the sample holding circuit 30, except that the latter slightly delays behind the former. Therefore, the correct sampling is ensured. The voltages obtained by the sample holding circuit 30 have the values of the vertical synchronizing signals 18a and 18b shown in FIGS. 5a and 5b and are located at the top and bottom of the energy dispersal signal. The maximum and minimum voltages of the energy dispersal signal obtained by the sample holding circuit 30, which ranges from peak to peak, are applied to a voltage difference detector 31. The voltage difference detector 31 produces a difference voltage signal which in turn is applied to an amplitude limiter 32. The amplitude limiter 32 is also supplied with a triangle wave signal from the triangle wave generator 29. The amplitude of the triangle wave signal varies with the difference voltage supplied from the voltage difference detector 31. The triangle wave signal with the amplitude properly varied is produced from the amplitude limiter 32 and, in an adder 51, is superposed on the channel select signal supplied from the channel selector 7 to the second local oscillator 8. As a matter of course, the oscillation frequency of the second local oscillator 8 varies with the triangle wave signal superposed. In other words, the oscillation frequency of the second local oscillator 8 is frequency-modulated by the triangle wave signal. A local signal frequency modulated is supplied from the second local oscillator 8 to the second mixer 6. When the local signal is frequency modulatd, the frequency of the television signal in VHF band varies. In the receiving circuit according to this invention, the frequency of the television signal is varied so that the frequencies of the vertical synchronizing signals 18a and 18b are almost intermediate between the frequencies $f_3$ and $f_2$. The frequency of the horizontal synchronizing signal located between the vertical synchronizing signals 18a and 18b is kept at an almost intermediate frequency between the frequencies $f_2$ and $f_3$. With this frequency allocation, the energy dispersal signal 100 is substantially removed.

As seen from the foregoing descriptions, the frequency dividing circuit 28, the sample holding circuit 30, the voltage difference detector 31, the triangle wave generator 29 and the amplitude limiter 32, which are shown in FIG. 6, make up a major part of the receiving circuit according to this invention, which serves as an energy dispersal signal supressing signal generator.

Figure 7:
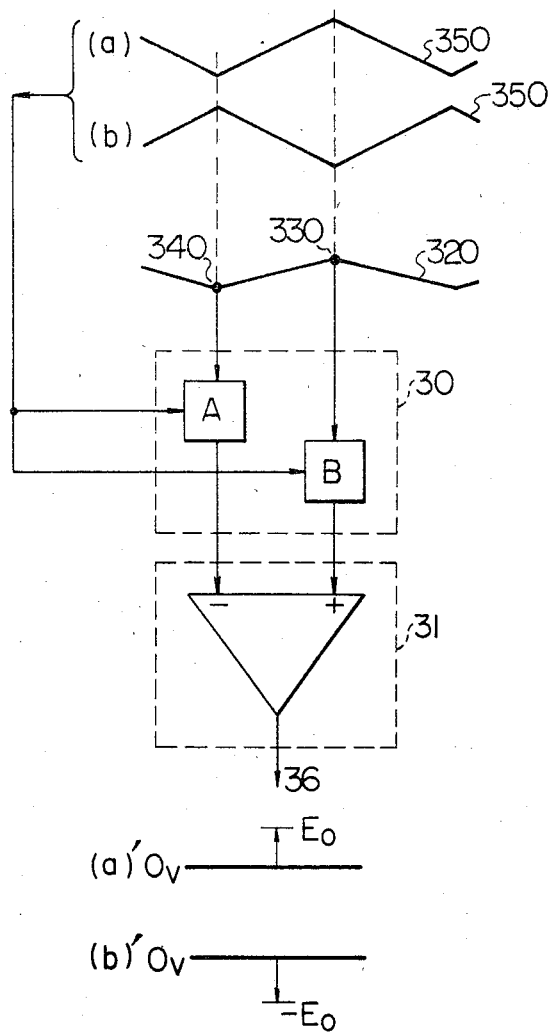
FIG. 7 is a block diagram showing a sample holding circuit and a difference voltage detecting circuit which are used in the receiving circuit according to this invention.

FIG. 7 is a block diagram showing a practical arrangement of the sample holding circuit 30 and the voltage difference detector 31 and waveforms for illustrating the operation of the circuits. The sample holding circuit 30 samples an output voltage 350 of the FM detector 10 at the top 330 and the bottom 340 of a triangle wave 320 generated by the triangle wave generator 29. A switch circuit A of the sample holding circuit 30 is in an on state at the bottom 340, and a switch circuit B is in an on state at the top 330. Voltages obtained by the circuits A and B are supplied to the voltage difference detector 31 mainly composed of a differential amplifier, for example, which produces a difference voltage between them. Assume now that a waveform of the energy dispersal signal 350 is as shown in (a) of FIG. 7. An output signal 36 of the voltage difference detector 31 is a positive voltage ($E_o$) as shown by (a)' of FIG. 7. When the energy dispersal signal 350 takes a waveform (b), the output signal of the voltage difference detector 31 is a negative voltage ($-E_o$) as shown by a voltage waveform (b'). In this way, the information of the amplitude and polarity of a triangle wave of the energy dispersal signal contained in the video signal are obtained by the voltage difference detector 31. In this instance, the sampling is performed in the order of the bottom 340 and the top 330 of the triangle wave 320. It is evident, however, that the reverse order, i.e. the top 330 to the bottom 340, is allowed for the sampling. The polarities of the input terminals of the voltage difference detector 31 may be interchanged if necessary.

The amplitude, limiter 32 controls the amplitude of the triangle wave signal generated by the triangle wave generator 29 according to the output signal of the voltage difference detector 31. Further, the limiter may continuously vary the amplitude of the triangle wave signal from the positive polarity to the negative polarity. This circuit may readily be realized using a circuit shown in FIG. 8, for example. The triangle wave signal generated by the triangle wave generator 29 is inputted to the terminal 37 and is divided into two. One of the divided triangle wave signals is applied to the negative input terminal of a differential amplifier 38, while the other to a variable gain amplifier 39. The output signal of the voltage difference detector 31 is applied to a variable gain terminal 40 of the variable gain amplifier 39. When two signals with the same amplitudes appear at the positive input terminal 38a and the negative input terminal (38b) of the differential amplifier 38, the differential amplifier 38 produces no output. A triangle wave signal produced from the differential amplifier 38 changes its amplitude from large to small and its polarity from positive to negative.

With the above arrangement, a feedback loop is formed containing the FM detector 10 and the second local oscillator 8, so that the local oscillation frequency is controlled to remove the energy dispersal signal.

Figure 9:
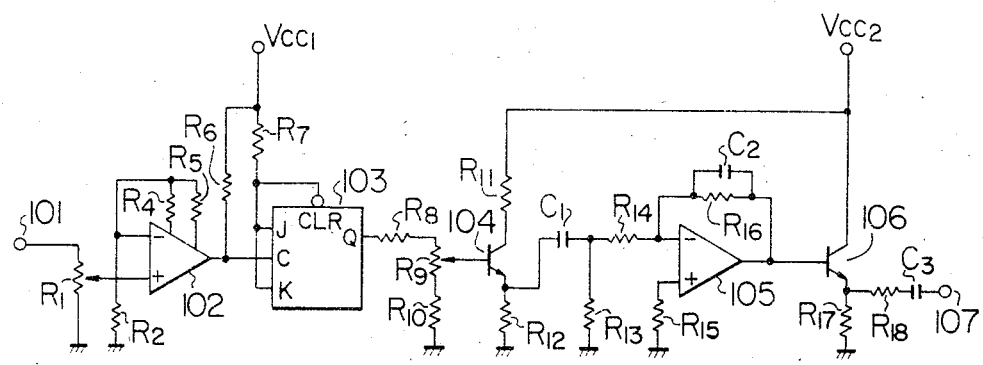
FIG. 9 is a circuit diagram showing a frequency dividing circuit and a triangle signal generating circuit in the receiving circuit according to this invention.

Turning now to FIG. 9, there is illustrated a practical arrangement of the frequency dividing circuit 28 and the triangle wave generator 29. When a vertical synchronizing signal is applied to a terminal 101, the vertical synchronizing signal is inputted to a wave shaper composed of an operation amplifier 102. In the wave shaper, the vertical synchronizing signal is wave shaped and is inputted to a ½ frequency divider composed of a J-K flip-flop 103. The J-K flip-flop 103 generates a rectangular wave signal at a frequency which is half of that of the vertical synchronizing signal. This rectangular wave signal is supplied to an integration circuit composed of an operation amplifier 105, a capacitor $C_2$ and resistors $R_{14}$ and $R_{16}$. The integration circuit converts the rectangular wave signal into a triangle wave signal. The triangle wave signal is outputted through a transistor 106 and a terminal 107. In FIG. 9, $R_1$ to $R_{18}$ designate resistors and $C_1$ to $C_3$ capacitors.

Figure 8:
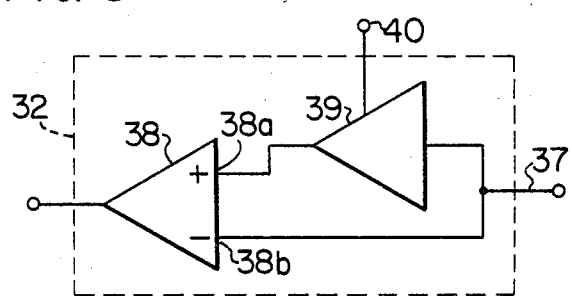
FIG. 8 is a block diagram showing an amplitude control circuit in the receiving circuit according to this invention.
Figure 10:
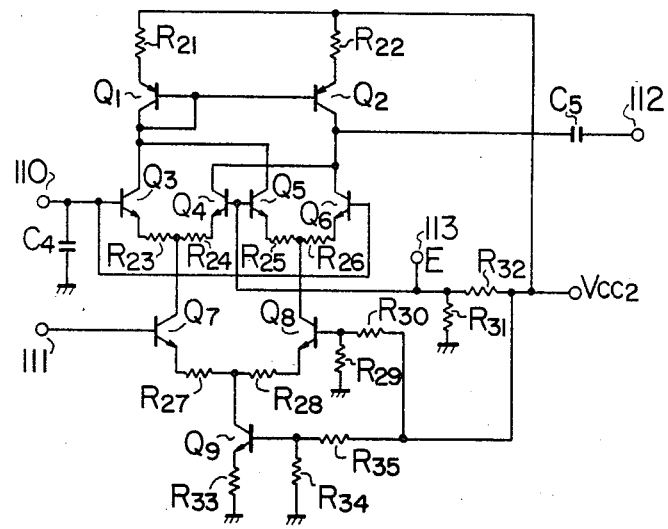
FIG. 10 is a circuit diagram of an amplitude control circuit in the receiving circuit according to this invention.

FIG. 10 shows a practical arrangement of the amplitude limiter. This circuit is a multiplier composed of resistors $R_{21}$ to $R_{35}$ and transistors $Q_1$ to $Q_9$. A terminal 110 of this circuit is supplied with a difference voltage generated by the voltage difference detector 31, while a terminal 111 with a triangle wave signal from the triangle wave generator 29. When the difference voltage supplied to the terminal 110 is equal to the voltage E at the terminal 113, no output signal appears at the terminal 112. When the voltage at the terminal 110 is different from that at the terminal 113, the difference voltage supplied to the terminal 110 is multiplied by the triangle signal supplied to the terminal 111. As a result, the amplitude and the polarity of the triangle wave signal are changed by the difference voltage signal, and the triangle wave signal thus controlled is outputted through the terminal 112. The triangle wave signal is superposed on the channel select signal. A capacitor $C_4$ smoothes a difference voltage supplied to the terminal 110 to make its changing slope gentle and to provide a smooth control. In the circuit shown in FIG. 10, the variable gain amplifier 39 and the differential amplifier 38, as shown in FIG. 8, are fabricated in an integral fashion.

Figure 11:
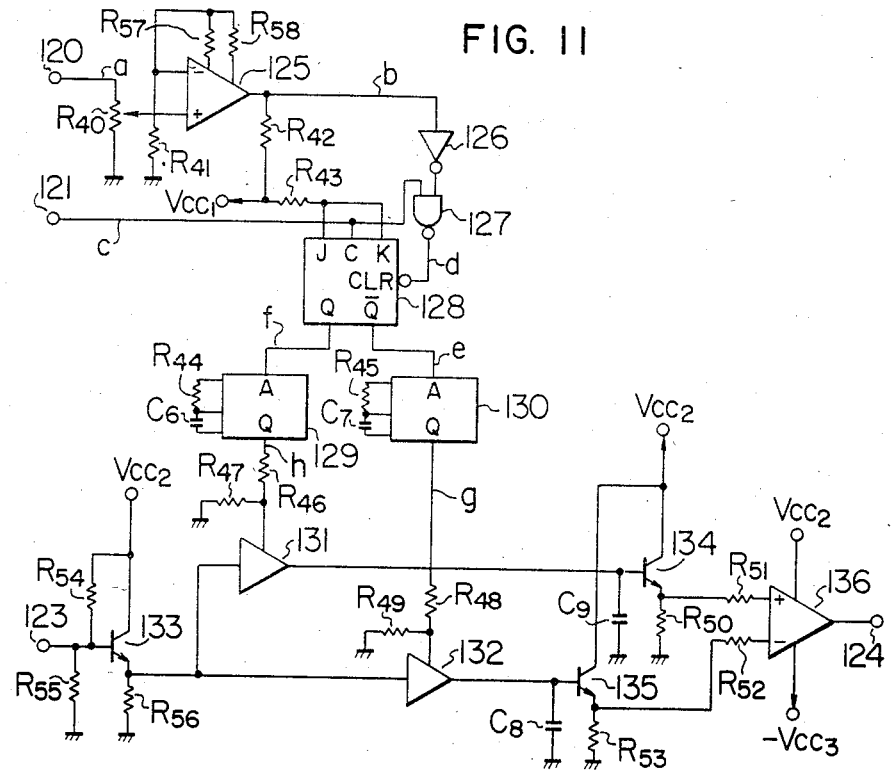
FIG. 11 is a diagram showing a sample holding circuit in the receiving circuit according to this invention.
Figure 12:
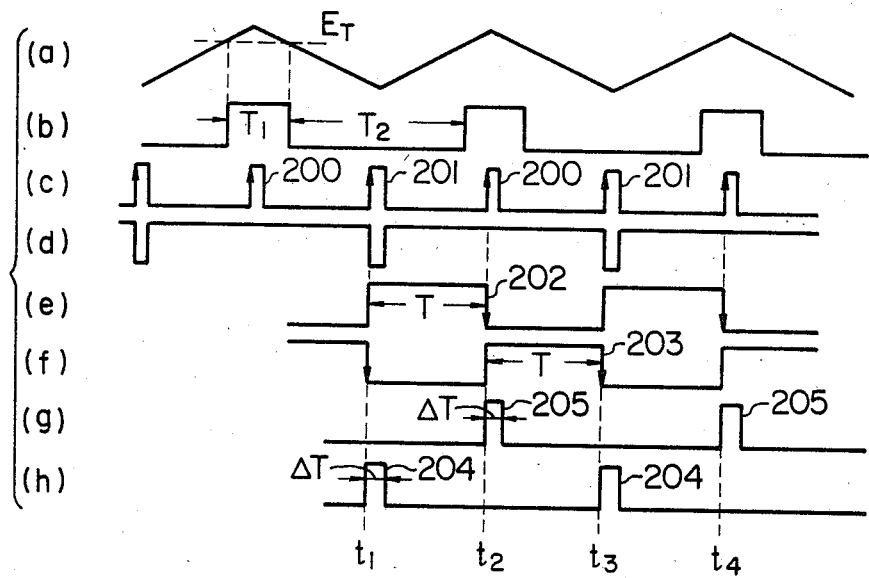
FIG. 12 shows waveforms of signals at key portions in the sample holding circuit.

FIG. 11 shows a practical arrangement of the sample holding circuit 30 and the voltage difference detector 31. In the circuit, the triangle wave signal is supplied to a terminal 120 and the vertical synchronizing signal to a terminal 121. A television signal generated by the FM detector 10 is supplied to a terminal 123. A triangle wave signal shown in FIG. 12(a) is applied to a Schmidt circuit 125 which in turn removes only a portion of the triangle wave signal exceeding the voltage $E_T$. Accordingly, the Schmidt circuit 125 produces a rectangular signal with a width $T_1$ as shown in FIG. 12(b). The rectangular wave signal is then applied to a NAND gate 127 by way of an inverter 126. The NAND gate 127 is supplied with a vertical synhcronizing signal from the terminal 121. The NAND gate 127 removes a vertical synchronizing signal 200 within the period $T_1$ but allows only a vertical synchronizing signal 201 within a period $T_2$ to pass therethrough. The vertical synchronizing signal 201 is supplied to a clear terminal CLR of a J-K flip-flop 128. A signal supplied to the clear terminal CLR of the J-K flip-flop 128 is shown in FIG. 12(d). A vertical synchronizing signal is applied from the terminal 121 to a clock input terminal C of the J-K flip-flop 128. At time $t_1$, the J-K flip-flop 128 is cleared. Until a vertical synchronizing signal 200 is inputted to the clock input terminal C, a rectangular wave signal 202 with a width T shown in FIG. 12(e) appears at an out-of-phase output terminal Q. A rectangular signal 203 shown in FIG. 12(f) appears at a positive phase sequence output terminal Q of the J-K flip-flop 128 during a period from $t_2$ to $t_3$. The output signals 203 and 202 of the J-K flip-flop 128 are supplied to monostable multivibrators 129 and 130, respectively. The monostable multivibrator 129 responds to a negative going edge of the output signal 203 to generate sampling pulses 204 with a width $\Delta T$ at times $t_1, t_3, \ldots$. The monostable multivibrator 130 responds to a negative going edge of the output signal 202 to produce a sampling pulse 205 with a width $\Delta T$ at times $t_2, t_4, \ldots$. The sampling pulses 204 and 205 are supplied to analog switches 131 and 132, respectively. The analog switches 131 and 132 are supplied with the television signal inputted to the terminal 123, through a transistor 133. The television signal of course has an energy dispersal signal superposed thereon. The energy dispersal signal is sampled by the pulses 204 and 205 through the analog switches 131 and 132. The voltage of the energy dispersal signal sampled at the top and the bottom of the triangle wave signal. The voltages sampled are stored and held in capacitors $C_8$ and $C_9$, respectively. The voltages held in the capacitors $C_8$ and $C_9$ are supplied through transistors 134 and 135 to a difference voltage detector 136. The difference voltage produced by the difference voltage detector 136 is produced from a terminal 124. In FIG. 11, $R_{40}$ to $R_{52}$ are resistors and $C_6$ to $C_9$ capacitors.

Figure 13:
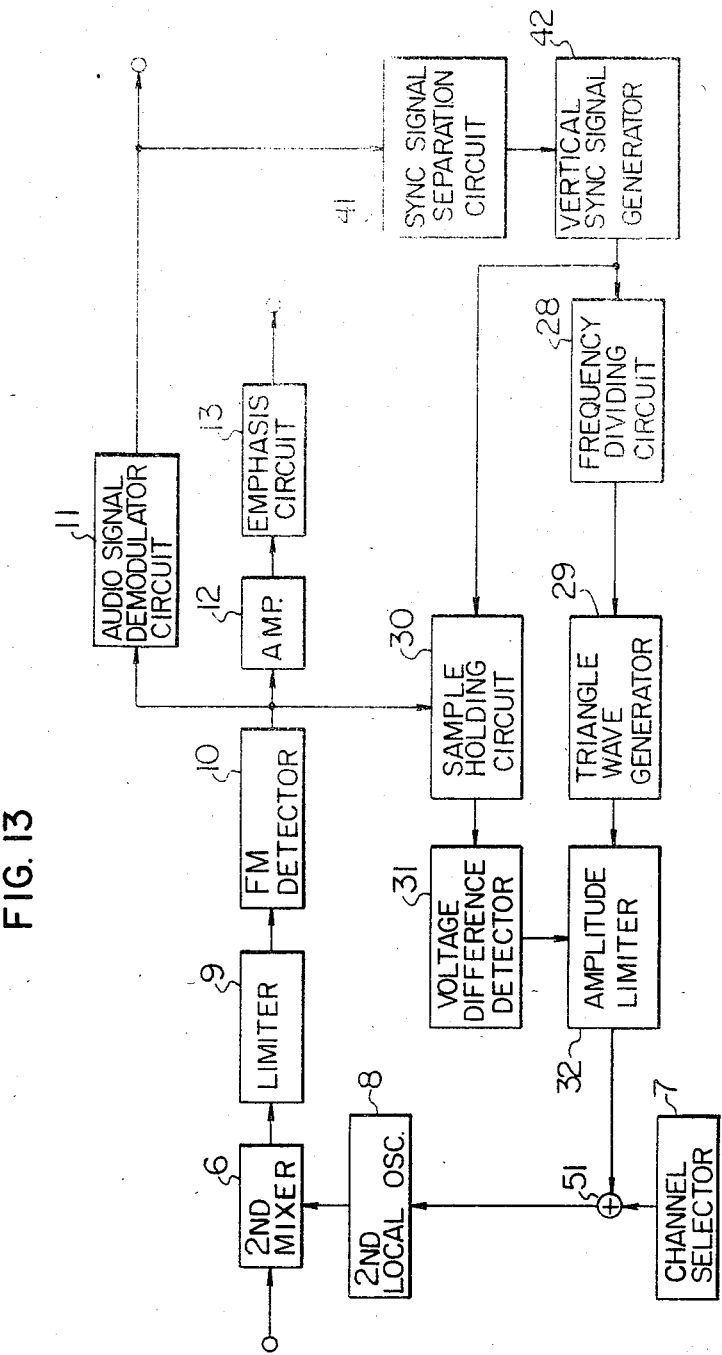
FIG. 13 shows a block diagram of a major part of a second embodiment of the receiving circuit according to this invention.

FIG. 13 shows another embodiment of a receiving circuit according to this invention. In the television signal in a scrambling television system, the synchronizing information is contained in the audio signal. In this embodiment, an output signal from the audio signal demodulator circuit 11 is partially applied to a synchronizing signal separation circuit 41 which in turn separates the synchronizing information from the video signal. A vertical synchronizing signal generator 42 forms a vertical synchronizing signal using the synchronizing information separated and supplies the vertical synchronizing signal to the frequency dividing circuit 28. Subsequently, the signal is processed in the same circuit arrangement as that of the first embodiment. In the television signal in the scrambling TV system, the synchronizing pulse is suppressed or no synchronizing pulse is used. The blanking part is fixed at a constant level. The energy dispersal signal is superposed on the television signal in synchronism with the vertical synchronizing signal. Thus, the voltage of the energy dispersal signal is sampled at the top and the bottom by the sample holding circuit 30. The above means removes the energy dispersal signal. While in the above embodiment the period of the energy dispersal signal is two times that of the vertical synchronizing pulse signal, the energy dispersal signal can be removed by changing the frequency dividing ratio of the frequency dividing circuit 28 even if the energy dispersal signal has the period other than the above mentioned one, which is in synchronism with the vertical synchronizing signal. As the result of the energy dispersal signal, no sag occurs in the vertical synchronizing signal, and the vertical synchronizing signal is correctly reproduced. Therefore, the television receiver can reproduce a coherent picture on the screen.

As described above, according to this invention, in a receiving circuit for receiving an FM-modulated television signal, the energy dispersal signal superposed on the television signal can readily and sufficiently be suppressed. Further, since the energy dispersal signal is sufficiently suppressed, the synchronizing signal from the synchronizing separation circuit is not accompanied by the sag. As a consequence, the television receiver of this invention can reproduce a coherent image with the correct synchronization.

What is claimed is:

1. A receiving circuit for receiving an FM-modulated television signal with an energy dispersal signal superposed thereon, comprising:
   (a) a channel select circuit for generating a channel select voltage which differs depending on a channel of a television signal to be received;
   (b) a local oscillating circuit for oscillating a local oscillation signal with a frequency which differs depending on a channel select voltage supplied from said channel select circuit;
   (c) a mixing circuit which is supplied with the FM-modulated television signal in a first frequency band and a local oscillation signal from said local oscillating circuit, and converts the FM-modulated television signal in the first frequency band into the FM-modulated television signal in a second frequency band;
   (d) a detector circuit for FM-detecting the FM-modulated television signal in the second frequency band supplied from said mixing circuit and converting it into a composite video signal; and
   (e) a circuit for generating a signal for supressing an energy dispersal signal, in which said circuit generates a triangle wave signal proportional to the amplitude of the energy dispersal signal in synchronism with the energy dispersal signal contained in the composite video signal applied and supplies the triangle wave signal to said local oscillating circuit to vary the frequency of the local oscillation signal.

2. A receiving circuit for receiving an FM-modulated television signal with an energy dispersal signal superposed thereon, comprising:
   (a) a channel select circuit for generating a channel select voltage which differs depending on a channel of a television signal to be received;
   (b) a local oscillating circuit for oscillating a local oscillation signal with a frequency which differs depending on a channel select voltage supplied from said channel select circuit;
   (c) a mixing circuit which is supplied with the FM-modulated television signal in a first frequency band and a local oscillation signal from said local oscillating circuit, and converts the FM-modulated television signal in the first frequency band into the FM-modulated television signal in a second frequency band;
   (d) a detector circuit for FM-detecting the FM-modulated television signal in the second frequency band supplied from said mixing circuit and converting it into a composite video signal;
   (e) a synchronizing separation circuit for separating a synchronizing signal from the composite video signal supplied from said detector circuit;
   (f) triangle wave generating means for generating a triangle wave signal at the same period as that of the energy dispersal signal on the basis of the synchronizing information of the vertical synchronizing signal supplied from said synchronizing separation circuit;
   (g) voltage detecting means for detecting the amplitude of the energy dispersal signal supplied from said detector circuit; and
   (h) an amplitude control circuit which is supplied with a signal dependent on the amplitude of the energy dispersal signal supplied from said voltage detecting means and with a triangle wave signal from said triangle wave generating means, and changes the amplitude of the triangle wave signal according to the amplitude of the energy dispersal signal to produce a triangle wave signal with an adjusted amplitude, and supplies the amplitude-adjusted triangle wave signal to said local oscillation circuit to vary the oscillation frequency of said local oscillation circuit.

3. A receiving circuit for receiving an FM-modulated television signal with an energy dispersal signal superposed thereon, comprising:
   (a) a channel select circuit for generating a channel select voltage which differs depending on a channel of a television signal to be received;
   (b) a local oscillating circuit for oscillating a local oscillation signal with a frequency which differs depending on a channel select voltage supplied from said channel select circuit;
   (c) a mixing circuit which is supplied with the FM-modulated television signal in a first frequency band and a local oscillation signal from said local oscillating circuit, and converts the FM-modulated television signal in the first frequency band into the FM-modulated television signal in a second frequency band;
   (d) a detector circuit for FM-detecting the FM-modulated television signal in the second frequency band supplied from said mixing circuit and converting it into a composite video signal;
   (e) a synchronizing separation circuit for separating a synchronizing signal from the composite video signal supplied from said detecting circuit;
   (f) a frequency dividing circuit for frequency dividing a repetition frequency of the vertical synchronizing signal supplied from said synchronizing separation circuit by a predetermined value to generate a frequency divided pulse at the same period as that of the energy dispersal signal;
   (g) a triangle wave generating circuit for generating a triangle wave signal at the same period as that of the energy dispersal signal supplied from said frequency dividing circuit;
   (h) a sample holding circuit which is supplied with a vertical synchronizing signal from said synchronizing separation circuit and the energy dispersal signal supplied from said detector circuit, and samples the energy dispersal signal by the vertical synchronizing signal and holds the sampled signal, and generates maximum and minimum voltages of the energy dispersal signal;
   (i) a voltage difference detecting circuit for generating a voltage difference signal representing a difference between the maximum and minimum voltages of the energy dispersal signal;
   (j) an amplitude control circuit which is supplied with a triangle wave signal from said triangle wave generating circuit and a voltage difference signal from said voltage difference detecting circuit, varies the amplitude of the triangle wave signal according to the voltage difference signal, and generates a triangle wave signal with an adjusted amplitude; and
   (k) adder means which is supplied with a channel select voltage supplied from said channel select signal circuit and the triangle wave signal with the adjusted amplitude from said amplitude control circuit and superposes the triangle wave signal on the channel select voltage.

4. A receiving circuit for receiving an FM-modulated television signal with an energy dispersal signal superposed thereon, comprising:
   (a) a channel select circuit for generating a channel select voltage which differs depending on a channel of a television signal to be received;
   (b) a local oscillating circuit for oscillating a local oscillation signal with a frequency which differs depending on a channel select voltage supplied from said channel select circuit;
   (c) a mixing circuit which is supplied with the FM-modulated television signal in a first frequency band and a local oscillation signal from said local oscillating circuit, and converts the FM-modulated television signal in the first frequency band into the FM-modulated television signal in a second frequency band;
   (d) a detector circuit for FM-detecting the FM-modulated television signal in the second frequency band supplied from said mixing circuit and converting it into a signal in a third frequency band;
   (e) a synchronizing separation circuit for separating a synchronizing signal from the signal in the third frequency band supplied from said detecting circuit;

(f) a frequency dividing circuit for frequency dividing a repetition frequency of the vertical synchronizing signal supplied from said synchronizing separation circuit by a predetermined value to generate a frequency divided pulse at the same period as that of the energy dispersal signal;

(g) a triangle wave generating circuit for generating a triangle wave signal at the same period as that of the energy dispersal signal supplied from said frequency dividing circuit;

(h) a sample holding circuit which is supplied with a vertical synchronizing signal from said synchronizing separation circuit and the energy dispersal signal supplied from said detector circuit, samples the energy dispersal signal by the vertical synchronizing signal and holds the sampled signal, and generates maximum and minimum voltages of the energy dispersal signal;

(i) a voltage difference detecting circuit for generating a voltage difference signal representing a difference between the maximum and minimum voltages of the energy dispersal signal;

(j) an amplitude control circuit which is supplied with a triangle wave signal from said triangle wave generating circuit and a voltage difference signal from said voltage difference detecting circuit, varies the amplitude of the triangle wave signal according to the voltage difference signal, and generates a triangle wave signal with an adjusted amplitude; and (k) adder means which is supplied with a channel select voltage supplied from said channel select signal circuit and the triangle wave signal with the adjusted amplitude from said amplitude control circuit and superposes the triangle wave signal on the channel select voltage.

5. A receiving circuit for receiving an FM-modulated television signal with an energy dispersal signal superposed thereon, comprising:

(a) a channel select circuit for generating a channel select voltage which differs depending on a channel of a television signal to be received;

(b) a local osicllating circuit for oscillating a local oscillation signal with a frequency which differs depending on a channel select voltage supplied from said channel select circuit;

(c) a mixing circuit which is supplied with the FM-modulated television signal in a first frequency band and a local oscillation signal from said oscillating circuit, and converts the FM-modulated television signal in the first frequency band into the FM-modulated television signal in a second frequency band;

(d) a detector circuit for FM-detecting the FM-modulated television signal in a second frequcney band supplied from said mixing circuit;

(e) an audio signal demodulator circuit connected to said FM detector circuit for demodulating an audio signal included in a television signal detected by said FM detector circuit;

(f) a synchronizing separation circuit connected to said audio signal demodulator circuit for receiving said audio signal from said audio signal demodulator circuit and for separating synchronizing information from said audio signals;

(g) a frequency dividing circuit for frequency dividing a repetition frequency of the vertical synchronizing signal supplied from said synchronizing separation circuit by a predetermined value to generate a frequency divided pulse at the same period as that of the energy dispersal signal;

(h) a triangle wave generating circuit for generating a triangle wave signal at the same period as that of the energy dispersal signal supplied from said frequency dividing circuit;

(i) a sample holding circuit which is supplied with a vertical synchronizing signal from said synchronizing separation circuit and the energy dispersal signal supplied from said detector circuit, samples the energy dispersal signal by the vertical synchronizing signal and holds the sampled signal, and generates maximum and minimum voltages of the energy dispersal signal;

(j) a voltage difference detecting circuit for generating a voltage difference signal representing a difference between the maximum and minimum voltage of the energy dispersal signal;

(k) an amplitude control circuit which is supplied with a triangle wave signal from said traingle wave generating circuit and a voltage difference signal from said voltage difference detecting circuit, varies the amplitude of the triangle wave signal according to the voltage difference signal, and generates a triangle wave signal with an adjusted amplitude; and (l) adder means which is supplied with a channel select voltage supplied from said channel select signal circuit and the triangle wave signal with the adjusted amplitude from said amplitude control circuit and superposes the triangle wave signal on the channel select voltage.

* * * * *